(12) United States Patent
Lee et al.

(10) Patent No.: US 10,699,850 B2
(45) Date of Patent: Jun. 30, 2020

(54) MULTILAYER CAPACITOR INCLUDING GRAPHENE PLATELETS

(71) Applicant: SAMSUNG ELECTRO-MECHANICS CO., LTD., Suwon-si, Gyeonggi-do (KR)

(72) Inventors: Seung Yong Lee, Suwon-si (KR); Yu Ra Shin, Suwon-si (KR); Hak Kwan Kim, Suwon-si (KR); Jin Bok Shin, Suwon-si (KR); Myung Joo Lee, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 58 days.

(21) Appl. No.: 16/177,093

(22) Filed: Oct. 31, 2018

(65) Prior Publication Data

US 2019/0333699 A1    Oct. 31, 2019

(30) Foreign Application Priority Data

Apr. 30, 2018    (KR) .................. 10-2018-0050241

(51) Int. Cl.
| | |
|---|---|
| *H01G 4/12* | (2006.01) |
| *C04B 35/468* | (2006.01) |
| *H01G 4/30* | (2006.01) |
| *C01B 32/182* | (2017.01) |
| *H01G 4/008* | (2006.01) |

(52) U.S. Cl.
CPC ............. *H01G 4/30* (2013.01); *C01B 32/182* (2017.08); *H01G 4/008* (2013.01); *H01G 4/1227* (2013.01); *C01B 2204/04* (2013.01)

(58) Field of Classification Search
CPC ...... H01G 4/12; H01G 4/1209; H01G 4/1218; H01G 4/1227; H01G 4/1236; H01G 4/1245; C04B 35/462; C04B 35/465; C04B 35/468; C04B 35/4682; C04B 35/4685; C04B 35/47
See application file for complete search history.

(56) References Cited

U.S. PATENT DOCUMENTS 8,962,504 B2 *   2/2015  Corral ................... C04B 35/632
                                                            252/502
2019/0272955 A1*  9/2019  Oh ........................... H01G 4/30

FOREIGN PATENT DOCUMENTS

| JP | 2006-107770 A | 4/2006 |
| KR | 10-2015-0128743 A | 11/2015 |
| KR | 10-2016-0007219 A | 1/2016 |
| WO | 2014/158970 A1 | 10/2014 |

* cited by examiner

*Primary Examiner* — Karl E Group
(74) *Attorney, Agent, or Firm* — Morgan Lewis & Bockius LLP (57) ABSTRACT

A multilayer capacitor includes a body including an internal electrode alternately disposed with a dielectric layer; and an external electrode disposed on the body and connected to the internal electrode. The dielectric layer includes a plurality of grains and grain boundaries disposed between adjacent grains, and the grain boundaries include a plurality of graphene platelets.

14 Claims, 6 Drawing Sheets

MULTILAYER CAPACITOR INCLUDING GRAPHENE PLATELETS

CROSS-REFERENCE TO RELATED APPLICATION(S)

This application claims the benefit of priority to Korean Patent Application No. 10-2018-0050241 filed on Apr. 30, 2018 in the Korean Intellectual Property Office, the disclosure of which is incorporated herein by reference in its entirety.

BACKGROUND

1. Field

The present disclosure relates to a multilayer capacitor.

2. Description of Related Art

A multilayer ceramic capacitor (MLCC) is a chip-type condenser mounted on the printed circuit substrates of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, are miniaturized and increased in power, there has been increased demand for miniaturized and high capacity multilayer ceramic capacitors. To simultaneously achieve miniaturization and high capacity, a dielectric with a high dielectric constant may be used, or the number of layers or an electrode area may be increased. However, there may be a limitation in increasing the number of layers and an electrode area because of the increased miniaturization.

Accordingly, the need for a dielectric having a higher dielectric constant has increased, but there is a difficulty in finding a suitable material having a higher dielectric constant than that of a conventional $BaTiO_3$ dielectric.

To address this issue, a method of utilizing an interfacial polarization phenomenon has been considered. The method uses a metal element and a space charge effect in an interfacial area of a dielectric by doping or coating barium titanate ($BaTiO_3$), a basic material forming a dielectric, with metal elements.

In the related art, a method for improving a dielectric constant by dispersing metal particles in $BaTiO_3$ and adding a space charge effect in a $BaTiO_3$/metal interfacial area is provided. However, in this case, there is a limitation in improving a dielectric constant, and a problem of degradation of reliability.

SUMMARY

An aspect of the present disclosure may provide a multilayer capacitor having improved dielectric properties through the addition of a plurality of graphene platelets to grain boundaries in a dielectric layer.

According to an aspect of the present disclosure, a multilayer capacitor is provided. The multilayer capacitor includes a body including an internal electrode alternately disposed with a dielectric layer; and an external electrode disposed on the body and connected to the internal electrode The dielectric layer includes a plurality of grains and grain boundaries formed between adjacent grains, and the grain boundaries include a plurality of graphene platelets.

According to another aspect of the present disclosure, a multilayer capacitor includes a body including an internal electrode alternately disposed with a dielectric layer; and an external electrode disposed on the body and connected to the internal electrode. The dielectric layer includes a plurality of grains and grain boundaries disposed between adjacent grains, and in the grain boundaries, peaks are detected in each of a D-band and a G-band when Raman analysis is performed.

According to another aspect of the present disclosure, a dielectric material includes a plurality of grains, and a plurality of grain boundaries disposed between adjacent grains. The grain boundaries include a plurality of graphene platelets.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, certain elements may be omitted to clearly describe the present disclosure, and to clearly express a plurality of layers and areas, thicknesses may be magnified. The same elements having the same function within the scope of the same concept will be described with use of the same reference numeral. Further, throughout the specification, it will be understood that when a part "includes" an element, it may further include another element, not excluding another element, unless otherwise indicated.

In the drawings, it will be understood that an X direction is a first direction or a length direction, that a Y direction is a second direction or a width direction, and that a Z direction is a third direction or a thickness direction or a layering direction, but are not limited thereto.

Multilayer Capacitor

Figure 1:
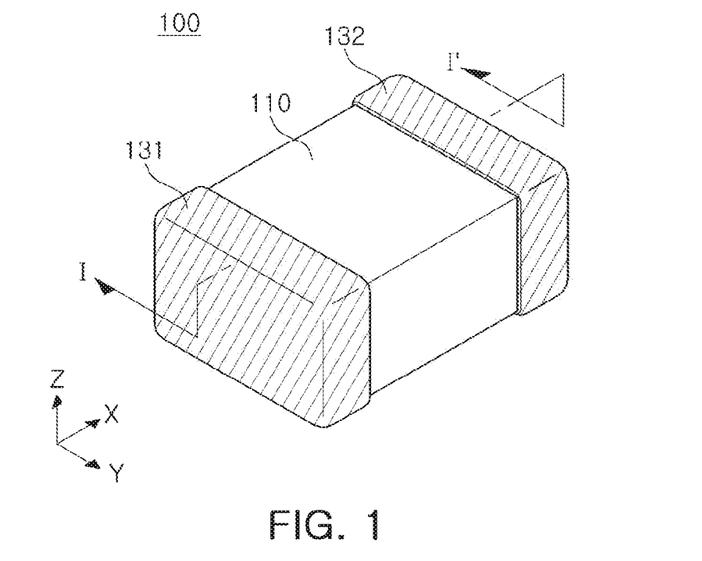
FIG. 1 is a schematic perspective view of a multilayer capacitor according to an exemplary embodiment in the present disclosure.
Figure 2:
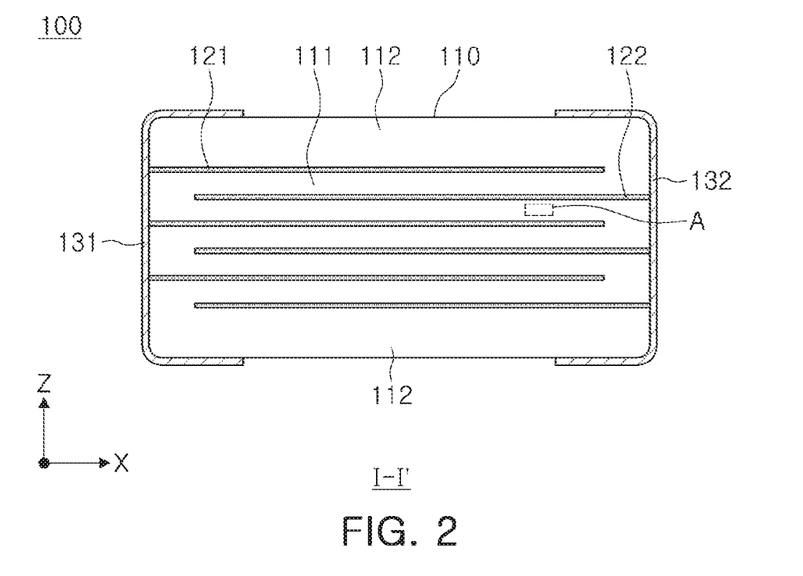
FIG. 2 is a cross-sectional view taken along line I-I' in FIG. 1.
Figure 3:
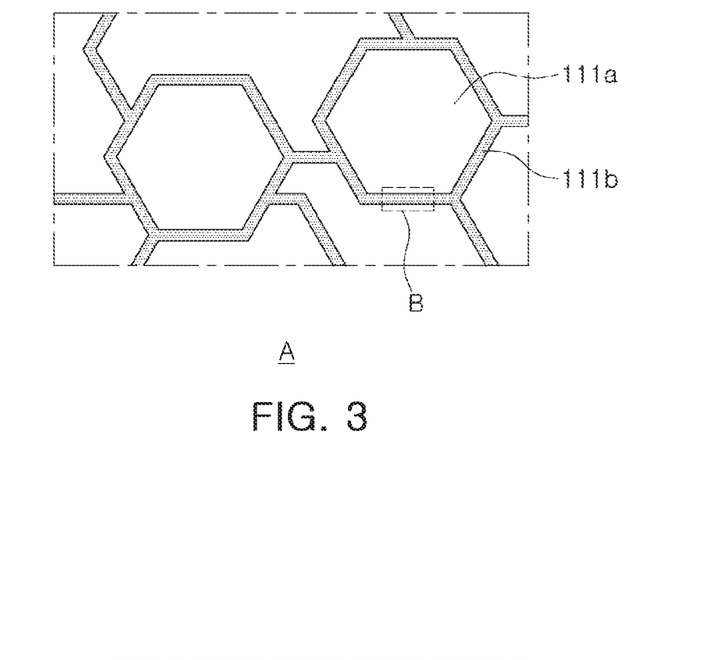
FIG. 3 is a magnified cross-sectional view of portion A in FIG. 2.
Figure 4:
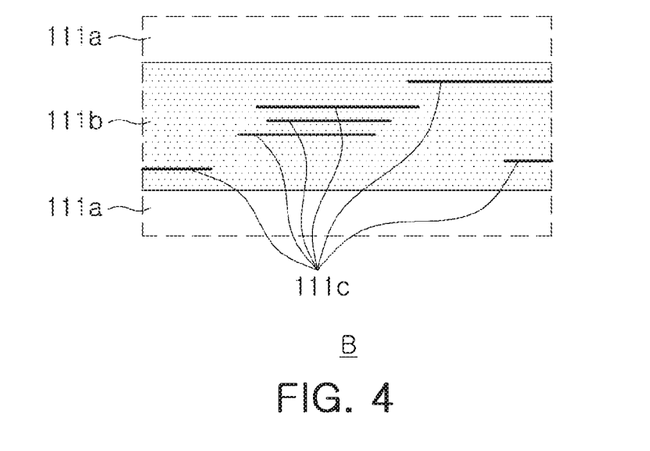
FIG. 4 is a magnified cross-sectional view of portion B in FIG. 3.

FIG. 1 is a schematic perspective view of a multilayer capacitor according to an exemplary embodiment in the present disclosure. FIG. 2 is a cross-sectional view taken along line I-I' in FIG. 1. FIG. 3 is a magnified cross-sectional view of A in FIG. 2. FIG. 4 is a magnified cross-sectional view of B in FIG. 3.

Hereinafter, a multilayer capacitor 100 will be described with reference to FIGS. 1, 2, 3, and 4 according to an exemplary embodiment.

Referring to FIG. 1, the multilayer capacitor 100 may include a body 110 and external electrodes 131 and 132 disposed on external surfaces of the body 110.

Referring to FIG. 2, the body 110 may include internal electrodes 121 and 122 alternately disposed with a dielectric layer 111 interposed therebetween.

In this case, the internal electrodes 121 and 122 may include first and second internal electrodes 121 and 122, and the external electrodes 131 and 132 may include first and second external electrodes 131 and 132, connected to the first and second internal electrodes 121 and 122, respectively.

The body 110 may be formed by layering the plurality of dielectric layers 111 in a thickness (Z) direction and sintering the plurality of dielectric layers 111. The shape, size and number of layers of the dielectric layers 111 may not be limited to the illustrated exemplary embodiment.

The plurality of dielectric layers 111 forming the body 110 maybe sintered, and boundaries between adjacent dielectric layers 111 may be integrated, such that the boundaries may be difficult to identify without using a scanning electron microscope (SEM).

Each of upper and lower portions of the body 110 may include a cover layer 112 formed by layering dielectric layers on which an internal electrode is not formed. The cover layer 112 may help to maintain reliability of a multilayer capacitor against external impacts.

FIG. 3 is a magnified cross-sectional view of part A in FIG. 2. FIG. 4 is a magnified cross-sectional view of part B in FIG. 3.

As illustrated in FIGS. 3 and 4, in the dielectric layer 111, a plurality of grains 111a, a grain boundary 111b formed between adjacent grains, and a plurality of graphene platelets 111c may be evenly dispersed in the grain boundary 111b according to an exemplary embodiment.

Figure 5:
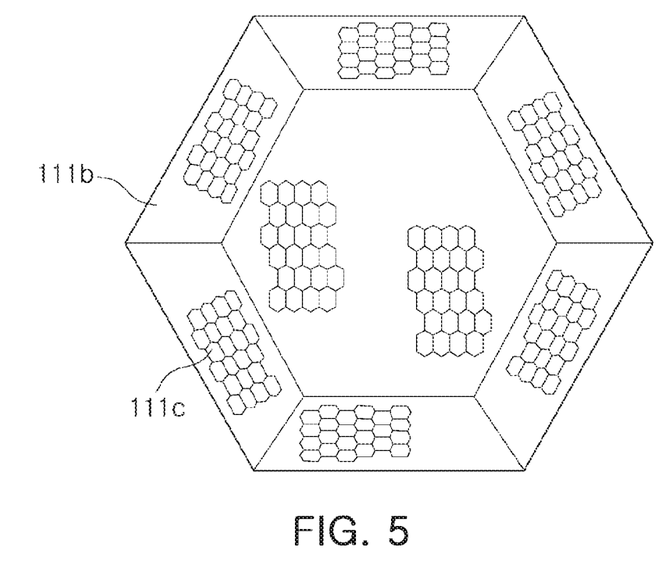
FIG. 5 is a schematic view of a distribution of graphene platelets on a grain boundary of a multilayer capacitor according to an exemplary embodiment in the present disclosure.

FIG. 5 is a schematic view of distribution of graphene platelets on a grain boundary. In FIG. 5, the grain boundary may be omitted to clarify the form of dispersion in relation to the grain 111a, and the grain may be illustrated as a polyhedron in a simple manner, and the upper surface and the side surfaces of the polyhedron may be illustrated.

As illustrated in FIG. 5, surfaces of the graphene platelets 111c may be disposed along the upper and side surfaces of the grain 111a.

Some of the plurality of graphene platelets may be layered, but the graphene platelets layered in 10 or more layers may be 5% or less of all graphene platelets. In the case in which the number of graphene platelets layered in 10 or more layers is higher than 5% of all graphene platelets, the effect of an increase of a dielectric constant may be reduced as the dispersivity of graphene platelets is reduced.

In this case, to evenly disperse the graphene platelets, an instability index of graphene may be controlled to be 0.1 or less by modifying the surface of graphene. The graphene platelets may need to be evenly dispersed in a slurry of an ethanol and toluene mixed solvent to obtain evenly dispersed graphene platelets after being sintered.

The instability index is a measure for evaluating dispersivity, and may be measured by using a LUMiSizer dispersion analyzer.

The graphene platelets 111c may be composed of carbon atoms and may be formed as a thin layer having a thickness of one atom. In other words, the graphene platelets 111c have a two-dimensional planar structure. The graphene platelets have a thickness of 0.2 nm and have very high physical and chemical stability, a degree of conductivity ten times higher than that of copper, and mechanical strength 200 times stronger than that of steel.

The graphene platelets included in the grain boundary may enlarge a Schottky barrier against a dielectric so as to forma space charge layer around the graphene platelets, thereby improving a dielectric constant of a dielectric composition.

The Schottky barrier is a potential barrier (an energy barrier) generated when metal contacts a semiconductor. When metal contacts a semiconductor, a carrier may move, for a Fermi level of two objects to be constant, and a space charge layer may be formed on a surface of semiconductor, thereby forming a potential barrier. Similarly, when a dielectric contacts a graphene platelet, a Schottky barrier may be generated between a dielectric and a graphene surface, and a space charge effect may be revealed, thereby improving a dielectric constant.

Also, graphene platelets may be positioned at the grain boundary and may induce a strain relaxation so that stability improves on the grain, thereby improving dielectric property.

In the case in which metal microparticles are used instead of graphene platelets, there is a problem of degradation of dispersivity of metal microparticles in the process of sintering, and the improvement of dielectric property by a space charge effect reduces radically in a high frequency or a high electric field.

However, according to the exemplary embodiment, in the case in which graphene platelets are used instead of metal microparticles, the dispersivity of graphene platelets may be maintained even in a high-temperature sintering environment, and the improved dielectric property may be maintained in a high frequency as many electrons of a graphene platelet compensate for an oxygen defect of a grain.

Meanwhile, the main component of the dielectric layer 111 may be barium titanate ($BaTiO_3$). As the main component is barium titanate ($BaTiO_3$), a ferroelectric with a high dielectric constant, a higher capacity and a higher dielectric constant may be implemented, as compared to the case in which SrTiO$_3$, a representative paraelectric, or a Ca$_x$Sr$_{(1-x)}$Zr$_y$Ti$_{(1-y)}$ perovskite mixed oxide is used.

Also, the content of graphene platelets may be 0.3 to 3 wt %, based on a total weight of the BaTiO$_3$. In the case in which the content of graphene platelets is less than 0.3 wt %, the space charge effect may not be sufficiently obtained, and in the case in which the content of graphene platelets is higher than 3 wt %, the dispersivity of graphene platelets may degrade.

FIGS. 6A to 6D and 7 are graphs illustrating the measurements of a dielectric constant, a DC Bias property, a permittivity change according to temperature, a permittivity according to a frequency, and a distribution of a grain boundary size on the basis of an Example Chip 1 manufactured using a dielectric sheet containing 0.5 wt % of graphene platelets, as compared to barium titanate and a Comparative Example 1 manufactured using a dielectric sheet which does not include graphene platelets.

Figure 6A:
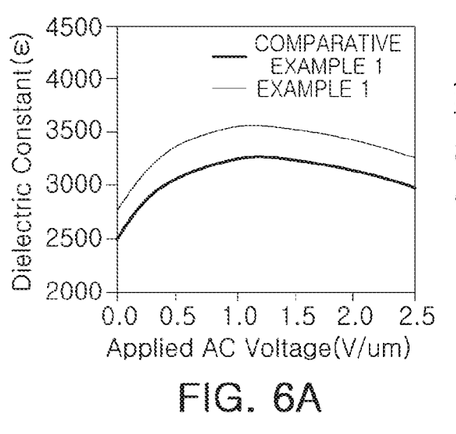
FIGS. 6A to 6D are graphs illustrating measurements of a dielectric constant, DC Bias properties, permittivity change according to temperature, and permittivity according to frequency for an Example Chip 1 manufactured using a dielectric sheet containing 0.5 wt % of graphene, as compared to barium titanate and a Comparative Example 1 manufactured using a dielectric sheet which does not include graphene platelets.
Figure 6B:
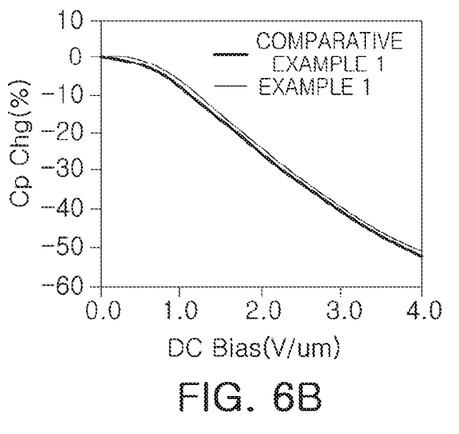
Figure 6C:
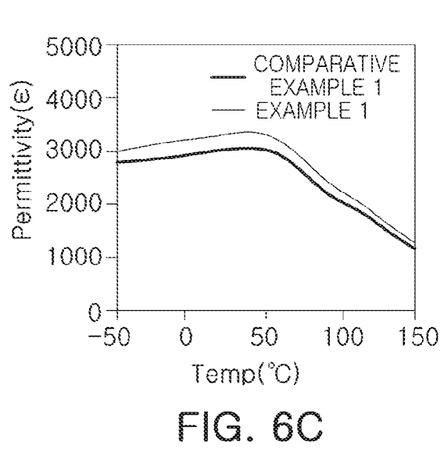
Figure 6D:
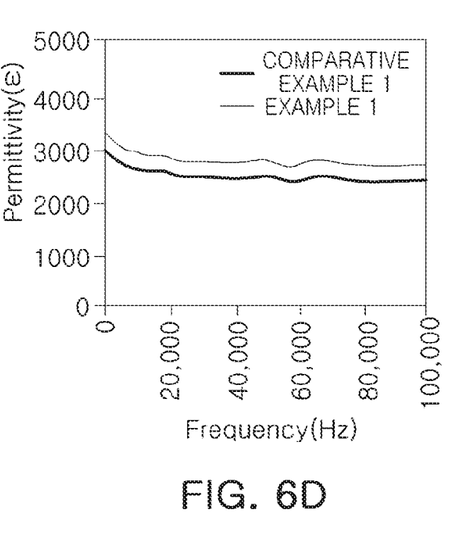

As shown in FIG. 6A, the dielectric constant may be increased by 15%, and, as shown in FIG. 6B, the DC Bias property may be increased as well. Also, as shown in FIGS. 6C and 6D, the improved dielectric property may be maintained even in a high temperature or a high frequency as indicated in the graphs.

Figure 7:
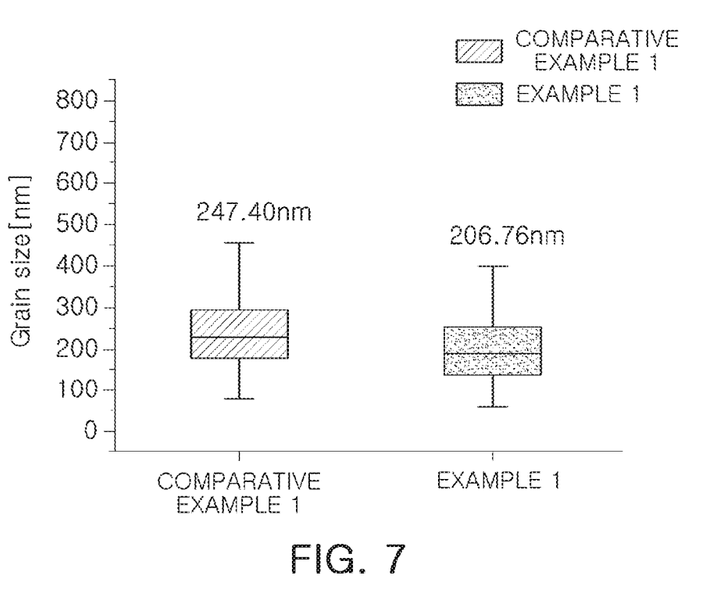
FIG. 7 is a distribution of grain boundary size for the Example 1 as compared to the Comparative Example 1.

As shown in FIG. 7, in the case in which the content of graphene platelets is 0.5 wt %, as compared to barium titanate, the average size of a grain may be reduced. Generally, the larger the average size of a grain, the more the dielectric property degrades. Thus, the improvement of dielectric property may be resulted by adding graphene platelets.

The internal electrodes 121 and 122 may be alternately layered with the dielectric layer and include the first and second internal electrodes 121 and 122. In this case, the first and second internal electrodes 121 and 122 may be alternately disposed to face each other with dielectric layer 111 interposed therebetween, and the first and second internal electrodes 121 and 122 may be exposed to opposite ends of the body 111. The first and second internal electrodes 121 and 122 may be electrically separated by the dielectric layer 111 interposed between the electrodes. The material forming the first and second internal electrodes 121 and 122 may not be limited, and may be formed of conductive paste comprised of more than one material among materials such as palladium (Pd), palladium-silver (Pd—Ag) alloy, and the like, and nickel (Ni) and copper (Cu), for example. As the printing method of the conductive paste, a screen printing method, a gravure printing method, or the like, may be used, but is not limited thereto. Also, the thickness of the first and second internal electrodes 121 and 122 may be determined depending on a usage, and the like, and may not be particularly limited. For example, the thickness may be 0.1 to 5 μm or 0.1 to 2.5 μm.

The external electrodes 131 and 132 may be disposed on the body 110 and be connected with the internal electrodes 121 and 122. As illustrated in FIG. 2, the external electrodes 131 and 132 may include the first and second external electrodes 131 and 132 which are connected to the first and second internal electrodes 121 and 122, respectively. In the exemplary embodiment, it is described that a capacitor part 100 has two external electrodes 131 and 132, but the number or form of the external electrodes 131 and 132 may vary depending on the form of the internal electrodes 121 and 122, or different purposes.

Meanwhile, the external electrodes 131 and 132 may be formed by using material having electric conductivity such as metal. The material may be specifically determined by considering electric property, structural stability, and the like, and may also be multilayered. For example, the external electrodes 131 and 132 may include an electrode layer formed of Ni and contacts a body and an internal electrode, a plating layer formed on an electrode layer.

Hereinafter, a multilayer capacitor will be described in greater detail according to another exemplary embodiment. The description of the same elements described in the aforementioned descriptions will not be repeated to avoid an overlap of description.

The multilayer capacitor according to another exemplary embodiment may include a body including an internal electrode configured to be alternately disposed with a dielectric layer, and an external electrode configured to be disposed on the body and connected to the internal electrode. The dielectric layer may include a plurality of grains and grain boundaries formed between adjacent grains, and in the grain boundary, a peak is detected in a D-band and a G-band when Raman analysis is carried out.

As the size of graphene platelets is very small, it is difficult to observe graphene platelets, even by using a transmission electron microscope (TEM), or the like, and it may also be difficult to distinguish a graphene platelet from other carbon allotropes such as graphite.

Figure 8:
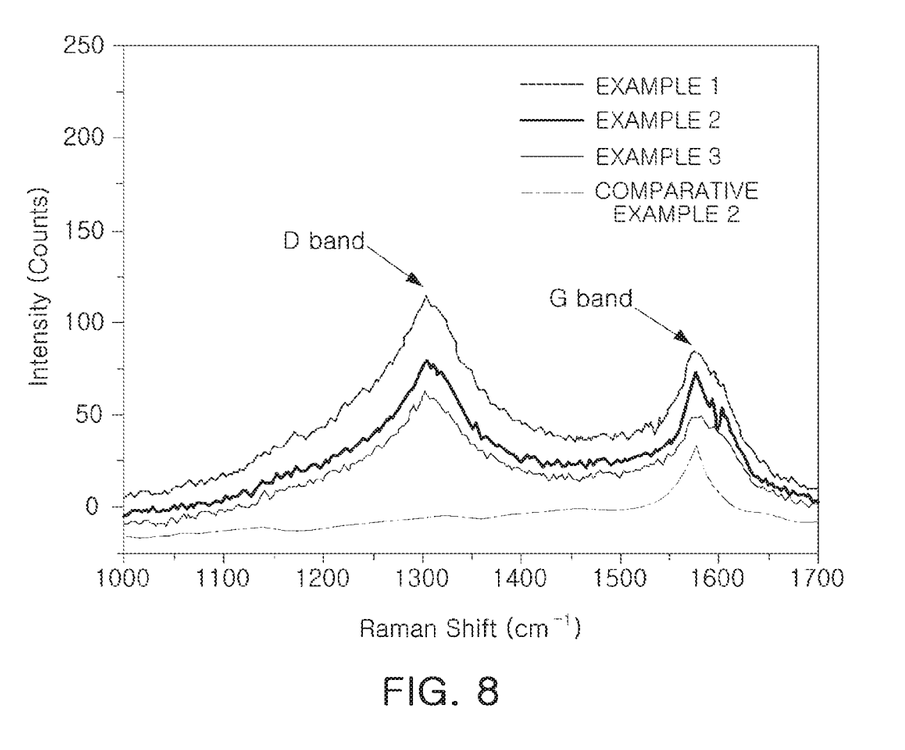
FIG. 8 is graphs illustrating a result of Raman analysis of a grain boundary of a dielectric layer including graphene platelets (Examples 1, 2 and 3) and a grain boundary of a dielectric layer including graphite (Comparative Example 2).

FIG. 8 is graphs illustrating a result of Raman analysis of a grain boundary of a dielectric layer including graphene platelets (Examples 1, 2 and 3) and a grain boundary of a dielectric layer including graphite (Comparative Example 2).

Referring to FIG. 8, in the grain boundary (Examples 1, 2 and 3) of the multilayer capacitor, a peak may be detected in a D-band and a G-band when Raman analysis is carried out according to another exemplary embodiment.

However, in the grain boundary (Comparative Example 2) including graphite, a carbon allotrope of graphene, a peak may only be detected in a G-band, and a peak may not be detected in a D-band.

Thus, by a Raman analysis method, it may be possible to determine whether graphene platelets are present and to distinguish graphene platelets from other carbon allotropes, and in the grain boundary of the multilayer capacitor, a peak may be detected in a D-band and a G-band when Raman analysis is carried out according to the exemplary embodiment.

According to an exemplary embodiment of the present disclosure, by adding a plurality of graphene platelets to a grain boundary in a dielectric layer, a multilayer capacitor having magnified dielectric properties may be provided.

While the exemplary embodiments have been shown and described above, it will be apparent to those skilled in the art that modifications and variations could be made without departing from the scope of the present invention as defined by the appended claims.

What is claimed is:

1. A multilayer capacitor comprising:
    a body including an internal electrode alternately disposed with a dielectric layer; and
    an external electrode disposed on the body and connected to the internal electrode,
    wherein the dielectric layer includes a plurality of grains and grain boundaries disposed between adjacent grains, and the grain boundaries include a plurality of graphene platelets.

2. The multilayer capacitor of claim 1, wherein at least one surface of the plurality of graphene platelets is disposed along a surface of the grain.

3. The multilayer capacitor of claim 1, wherein graphene platelets including ten or more layers, among the plurality of graphene platelets, are provided in an amount of 5% or less of overall graphene platelets, based on a total number of graphene platelets in the multilayer capacitor.

4. The multilayer capacitor of claim 1, wherein the plurality of graphene platelets have an instability index of 0.1 or less.

5. The multilayer capacitor of claim 1, wherein the dielectric layer has barium titanate ($BaTiO_3$) as a main component.

6. The multilayer capacitor of claim 5, wherein a content of the plurality of graphene platelets is 0.3 wt % to 3.0 wt %, based on a total weight of the barium titanate ($BaTiO_3$).

7. The multilayer capacitor of claim 1, wherein the graphene platelets are evenly dispersed in the grain boundary.

8. A multilayer capacitor comprising:
   a body including an internal electrode alternately disposed with a dielectric layer; and
   an external electrode disposed on the body and connected to the internal electrode,
   wherein the dielectric layer includes a plurality of grains and grain boundaries disposed between adjacent grains, and in the grain boundaries, peaks are detected in each of a D-band and a G-band when Raman analysis is performed.

9. The multilayer capacitor of claim 8, wherein the grain boundaries include a plurality of graphene platelets.

10. The multilayer capacitor of claim 9, wherein surfaces of the plurality of graphene platelets are disposed along a surface of the grain.

11. The multilayer capacitor of claim 9, wherein graphene platelets layered in ten or more layers, among the plurality of graphene platelets, are provided in 5% or less of overall graphene platelets.

12. The multilayer capacitor of claim 9, wherein the dielectric layer has barium titanate ($BaTiO_3$) as a main component.

13. The multilayer capacitor of claim 12, wherein a content of the plurality of graphene platelets is 0.3 wt % to 3.0 wt %, based on a total weight of the barium titanate ($BaTiO_3$).

14. The multilayer capacitor of claim 9, wherein the graphene platelets are evenly dispersed in the grain boundary.

* * * * *